United States Patent [19]
Marumoto et al.

[11] Patent Number: 5,818,178
[45] Date of Patent: Oct. 6, 1998

[54] VALVE CONTROL APPARATUS FOR AN AUTOMOBILE

[75] Inventors: Katsuji Marumoto, Hitachi; Toshimichi Minowa, Mito; Mineo Kashiwaya, Hitachinaka; Matsuo Amano, Hitachi, all of Japan

[73] Assignee: Hitachi, Ltd., Japan

[21] Appl. No.: 611,774

[22] Filed: Mar. 6, 1996

[30] Foreign Application Priority Data

Mar. 6, 1995 [JP] Japan ..................................... 7-045327

[51] Int. Cl.⁶ .................................................. H02K 23/00
[52] U.S. Cl. .......................... 318/254; 318/439; 318/489; 318/599
[58] Field of Search ..................................... 318/446, 254, 318/439, 138, 800–811, 286, 432–434, 466–470, 489, 599

[56] References Cited

U.S. PATENT DOCUMENTS

| | | | |
|---|---|---|---|
| 5,157,956 | 10/1992 | Isaji et al. | 73/118.1 X |
| 5,202,813 | 4/1993 | Uota et al. | 361/154 |
| 5,231,344 | 7/1993 | Marumoto et al. | |
| 5,581,452 | 12/1996 | Yamamoto | 363/41 |

FOREIGN PATENT DOCUMENTS

| | | |
|---|---|---|
| 3937102 | 5/1990 | Germany . |
| 4299132 | 10/1992 | Japan . |
| 6-54591 | 2/1994 | Japan . |

*Primary Examiner*—Brian Sircus
*Attorney, Agent, or Firm*—Evenson, McKeown, Edwards & Lenahan, P.L.L.C.

[57] ABSTRACT

In a valve control apparatus for an automobile, an H-bridge type chopper main circuit 4 is operated by a control signal PWM from a microcomputer 1 to thereby drive a motor 9 for controlling a throttle valve 10. The power element current from the chopper main circuit 4 is detected by a shunt resistor 5 in the form of a voltage, and the detected voltage is amplified by an amplifier 6 and then taken into the microcomputer 1 through a sample hold circuit 12 and an A/D converter. The sample hold circuit 12 is operated in synchronism with the control signal PWM from the microcomputer 1. Further, the A/D converter is also operated in synchronism with the control signal PWM from the microcomputer 1. The motor 9 is controlled by a throttle valve opening angle command and a throttle valve opening angle signal, and further the motor 9 is controlled by a detected motor current.

8 Claims, 14 Drawing Sheets

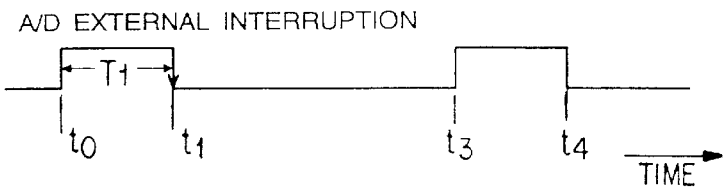
FIG. 3A PWM
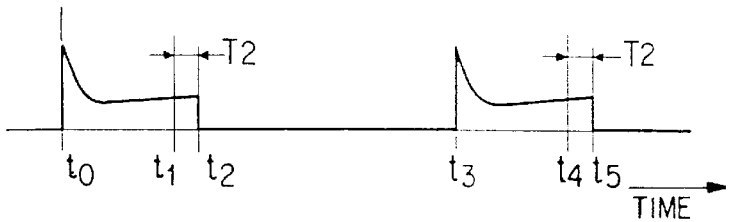
FIG. 3B POWER ELEMENT CURRENT $I_D$
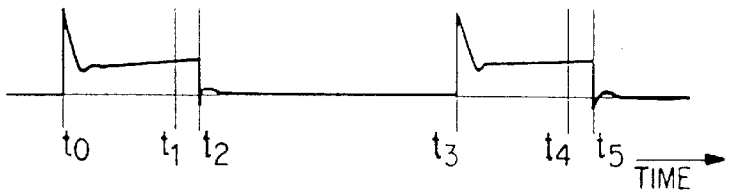
FIG. 3C SHUNT RESISTOR VOLTAGE $V_{DA}$
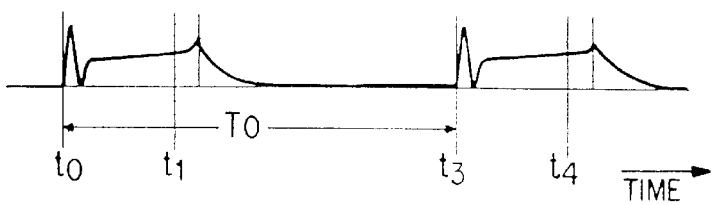
FIG. 3D AMPLIFIER OUTPUT VOLTAGE $V_D$
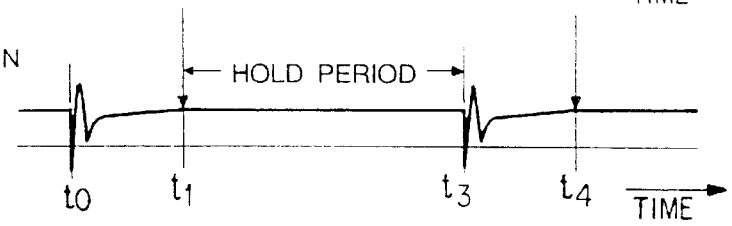
FIG. 3E CURRENT DETECTION SIGNAL $V_{DH}$ (INPUT TO MICROCOMPUTER)
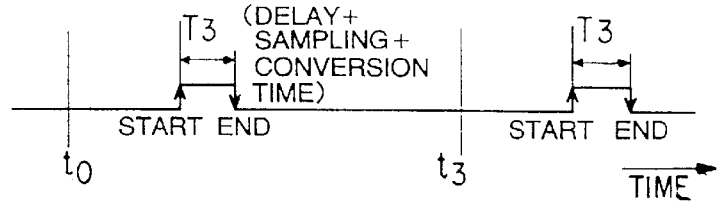
FIG. 3F TAKING-INTO A/D CONVERTER
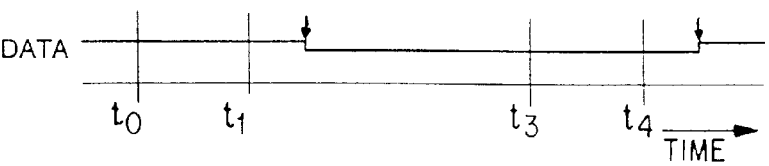
FIG. 3G MICROCOMPUTER DATA (IDCURNT)
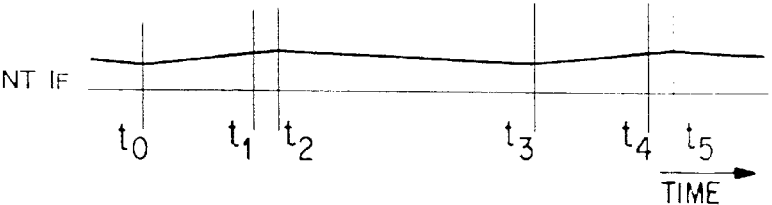
FIG. 3H MOTOR CURRENT $I_F$

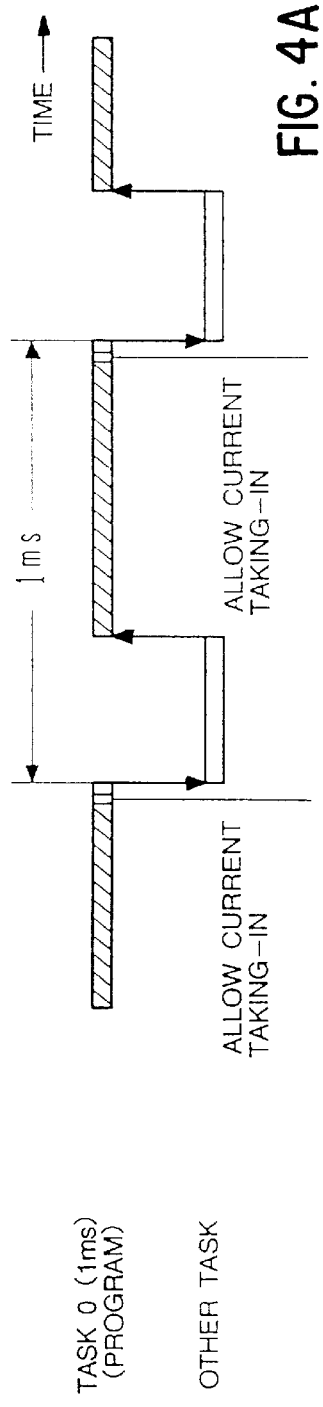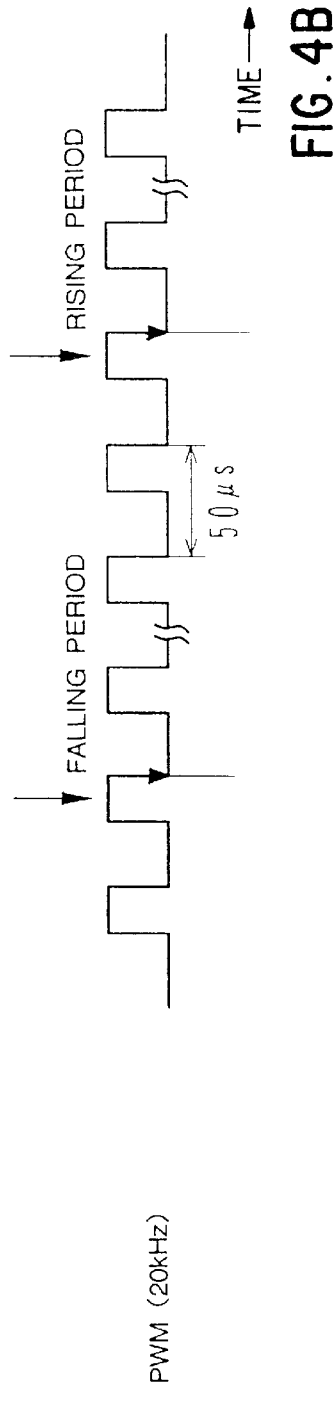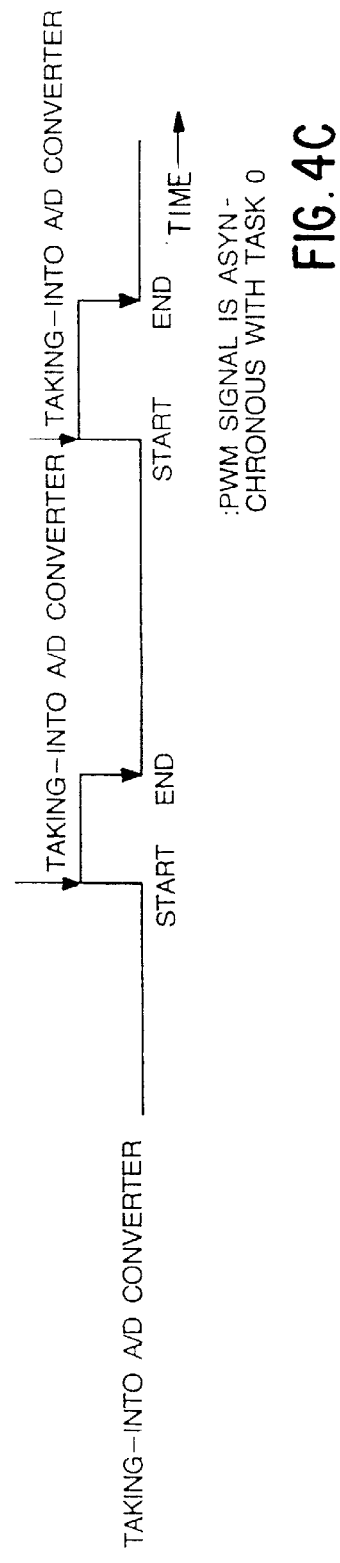

VALVE CONTROL APPARATUS FOR AN AUTOMOBILE

BACKGROUND OF THE INVENTION

The present invention relates to a valve control apparatus for an automobile and, more particularly, relates to the valve control apparatus for an automobile suitable for controlling the valve by using a motor.

As an example of the conventional valve control apparatus for an automobile, for example, an electronic throttle valve control apparatus has been known which controls the throttle valve mounted in an intake manifold by a motor so as to adjust a quantity of air sucked into an engine.

In general, the opening angle of the throttle valve is controlled in a manner that the opening angle of the throttle valve is detected by a potentiometer or the like directly coupled to the rotation shaft of the throttle valve and the throttle valve is controlled such that the detected opening angle thereof becomes a target opening angle.

Further, another control method is known as disclosed in JP-A-6-54591, for example, in which a motor current flowing into a motor for rotating the throttle valve is subjected to the chopper control by a H-bridge type chopper main circuit, and the current flowing into the motor itself is detected and then the feedback control is performed based on the detected motor current.

SUMMARY OF THE INVENTION

In the disclosure of JP-A-6-54591, a resistor is inserted in series with a motor serving as a load and a motor current itself flowing into the motor is detected by measuring a terminal voltage across the resistor. In general, a voltage of 5 V, for example, generated from a battery voltage of 12 V through a stabilized power supply is used as the driving voltage for an amplifier for amplifying the detected voltage. However, when the power elements of the H-bridge type chopper main circuit are turned ON, the battery voltage of 12 V for an automobile is applied to the amplifier. Accordingly, in the conventional method for measuring the terminal voltage of the resistor inserted in series with the motor serving as a load, there arises a problem that an amplifier used in general can not be employed and an expensive insulation-type current detector or the like must be employed.

Accordingly, an object of the present invention is to provide a valve control apparatus for an automobile which is able to easily detect a current flowing into a motor for driving a valve without using an expensive insulation-type current detector and to perform the feedback control based on the detected current.

Another object of the present invention is to provide a valve control apparatus for an automobile which is able to control a valve with high accuracy.

In order to attain the aforesaid object, the present invention provides a valve control apparatus for an automobile which includes: a valve; a motor for driving the valve; a chopper circuit for subjecting a current flowing into the motor to chopper control to thereby control rotation of the motor; a pulse width modulation (PWM) driving circuit for supplying a pulse-width-modulated control signal to the chopper circuit; a control unit for supplying the control signal to the PWM driving circuit to control an opening angle of the valve; and a current detection unit for detecting a current flowing through a power element constituting the chopper circuit which intermittently changes in accordance with the pulse-width-modulated control signal, wherein the control unit changes the control signal supplied to the PWM driving circuit on the basis of the current detected by the current detection unit to thereby control the opening angle of the valve.

In the valve control apparatus for an automobile, preferably, the current detection unit includes a resistor for current detection connected in series with the chopper circuit, and an analog to digital (A/D) converting unit for converting a terminal voltage across the resistor for current detection into a digital signal in accordance with the control signal.

In the valve control apparatus for an automobile, preferably, the current detection unit further includes a sample hold circuit for sampling and holding the terminal voltage across the resistor for current detection in accordance with the control signal, wherein the A/D converting unit converts the terminal voltage sampled and held by the sample and hold circuit into the digital signal in accordance with the control signal.

In the valve control apparatus for an automobile, preferably, the sample and hold circuit samples and holds the terminal voltage in synchronism with a falling of a pulse of the pulse-width-modulated control signal.

In the valve control apparatus for an automobile, preferably, the A/D converting unit starts converting the terminal voltage into the digital signal in synchronism with a falling of a pulse of the pulse-width-modulated control signal.

In order to attain the aforesaid object, the present invention provides a valve control apparatus for an automobile which includes a valve; a motor for driving the valve; a chopper circuit for subjecting a current flowing into the motor to chopper control to thereby control rotation of the motor; a PWM driving circuit for supplying a pulse-width-modulated control signal to the chopper circuit; a control unit for supplying the control signal to the PWM driving circuit to control an opening angle of the valve; a current detection unit for detecting a current flowing through a power element constituting the chopper circuit; and a valve opening angle detecting unit for detecting an opening angle of the valve, wherein the control unit controls the opening angle of the valve in accordance with a command of an opening angle of the valve input therein and the opening angle detected by the valve opening angle detecting unit, and further changes the control signal supplied to the PWM driving circuit on the basis of the current detected by the current detection unit to thereby control the opening angle of the valve.

In the valve control apparatus for an automobile, preferably, the current detection unit includes a resistor for current detection connected in series with the chopper circuit, and an A/D converting unit for converting a terminal voltage across the resistor for current detection into a digital signal in accordance with the control signal.

In the valve control apparatus for an automobile, preferably, the current detection unit further includes a sample hold circuit for sampling and holding the terminal voltage across the resistor for current detection in accordance with the control signal, wherein the A/D converting unit converts the terminal voltage sampled and held by the sample and hold circuit into the digital signal in accordance with the control signal.

In the valve control apparatus for an automobile, preferably, the sample and hold circuit samples and holds the terminal voltage in synchronism with a falling of a pulse of the pulse-width-modulated control signal.

In the valve control apparatus for an automobile, preferably, the A/D converting unit starts converting the terminal voltage into the digital signal in synchronism with a falling of a pulse of the pulse-width-modulated control signal.

In the present invention, the current detection unit detects the current flowing through the power element constituting the chopper circuit which intermittently changes in accordance with the pulse-width-modulated control signal, and the control unit changes the control signal supplied to the PWM driving circuit on the basis of the current detected by the current detection unit to thereby control the opening angle of the valve, so that the current flowing into the motor for driving the valve can be detected easily and the feedback control can be performed based on the detected current.

The current detection unit is formed by the resistor for current detection connected in series with the chopper circuit, and the A/D converting unit for converting the terminal voltage across the resistor for current detection into the digital signal in accordance with the control signal, so that variation of the detected motor current can be made little.

The current detection unit further includes the sample hold circuit for sampling and holding the terminal voltage across the resistor for current detection in accordance with the control signal, and the A/D converting unit converts the terminal voltage sampled and held by the sample and hold circuit into the digital signal in accordance with the control signal, so that the linearlity of the detected motor current can be made good in a range from a small current value to a large current value.

The sample and hold circuit samples and holds the terminal voltage in synchronism with a falling of a pulse of the pulse-width-modulated control signal, so that the current value can be detected without being influenced by the vibration of the current at the rising thereof.

The A/D converting unit starts converting the terminal voltage into the digital signal in synchronism with a falling of a pulse of the pulse-width-modulated control signal, so that the current value can be detected without being influenced by the vibration of the current at the rising thereof.

In the present invention, the current detection unit detects the current flowing through the power element constituting the chopper circuit which intermittently changes in accordance with the pulse-width-modulated control signal, and the control unit controls the opening angle of the valve in accordance with the command of the opening angle of the valve input therein and the opening angle detected by the valve opening angle detecting unit, and further changes the control signal supplied to the PWM driving circuit on the basis of the current detected by the current detection unit to thereby control the opening angle of the valve, so that the opening angle of the valve can be controlled with high accuracy.

The current detection unit is formed by the resistor for current detection connected in series with the chopper circuit, and the A/D converting unit for converting the terminal voltage across the resistor for current detection into the digital signal in accordance with the control signal, so that variation of the detected motor current can be made little.

The current detection unit further includes the sample hold circuit for sampling and holding the terminal voltage across the resistor for current detection in accordance with the control signal, and the A/D converting unit converts the terminal voltage sampled and held by the sample and hold circuit into the digital signal in accordance with the control signal, so that the linearlity of the detected motor current can be made good in a range from a small current value to a large current value.

The sample and hold circuit samples and holds the terminal voltage in synchronism with a falling of a pulse of the pulse-width-modulated control signal, so that the current value can be detected without being influenced by the vibration of the current at the rising thereof.

The A/D converting unit starts converting the terminal voltage into the digital signal in synchronism with a falling of a pulse of the pulse-width-modulated control signal, so that the current value can be detected without being influenced by the vibration of the current at the rising thereof.

BRIEF DESCRIPTION OF THE DRAWINGS

FIG. 3 shows a waveform diagram used to explain the principle of current detection of the electronic throttle valve control apparatus according to the embodiment;

FIG. 4 shows a timing chart used to explain the principle of current detection of the electronic throttle valve control apparatus according to the embodiment;

DESCRIPTION OF THE PREFERRED EMBODIMENT

A valve control apparatus for an automobile according to the embodiment of the present invention will be described with reference to the accompanying drawings, in which case the present invention is applied to an electronic throttle valve control apparatus.

Figure 1:
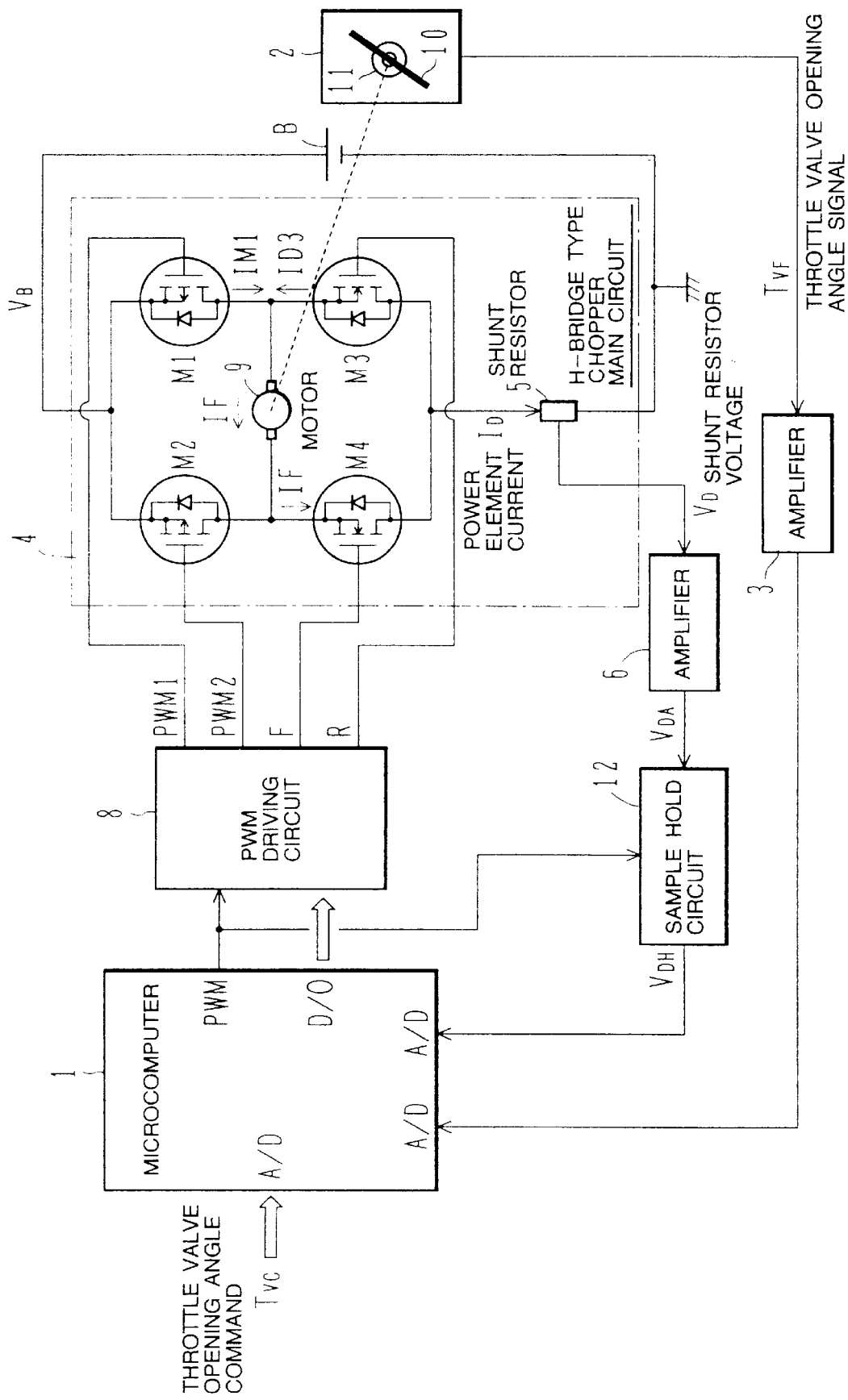
FIG. 1 is a block diagram showing the system configuration of the electronic throttle valve control apparatus according to an embodiment of the present invention.

FIG. 1 shows the control system configuration of the electronic throttle valve control apparatus according to the embodiment.

In FIG. 1, a throttle valve opening degree or opening angle control command Tvc for instructing an opening angle of a throttle valve mounted within an intake manifold of an internal combustion engine for an automobile is applied to an analog to digital (A/D) input of a microcomputer 1. The command Tvc is converted into a digital signal by an A/D converter contained in the microcomputer 1. The throttle valve opening angle command Tvc is an analog signal representing a detected value of a depression degree of an accelerator pedal. Alternately, the throttle valve opening angle command Tvc may be obtained in the following manner. That is, the detection signal of a depression degree of the accelerator pedal may be taken into a microcomputer for engine control. The microcomputer for engine control may arithmetically operate the detection signal according to various conditions of the engine and then output the throttle valve opening angle command Tvc in the form of a digital signal, which in turn may be taken into the microcomputer 1. Supposing that a period of a pulse width modulation (PWM) signal is Ta and an ON-state pulse width thereof is Tb, a data signal representing a duty ratio such as (Tb/Ta) may be employed as the digital signal of the throttle valve opening angle command Tvc.

An opening angle of a throttle valve 10 rotatably mounted on a throttle body 2 is detected by a potentiometer 11 coupled to the rotation shaft of the throttle valve 10. The opening angle of the throttle valve 10 detected by the potentiometer 11 is supplied as a throttle valve opening angle signal $T_{VF}$ to an amplifier 3 and amplified therein, then input into an A/D input of the microcomputer 1 and then converted into a digital signal by an A/D converter contained in the microcomputer 1.

The microcomputer 1 outputs a control signal (pulse width modulation signal) PWM and a control signal D/O to a PWM driving circuit 8 on the basis of the throttle valve opening angle command Tvc and the throttle valve opening angle signal $T_{VF}$. The control signal PWM is a pulse signal whose period is constant but a duty ratio thereof is variable. The microcomputer 1 arithmetically operates the PWM pulse signal such that the larger the difference between the throttle valve opening angle command Tvc and the throttle valve opening angle signal $T_{VF}$ is, the larger the duty ratio thereof becomes. The control signal D/O is a control signal of two bits for representing four states of a motor 9, that is, "forward rotation" and "reverse rotation" representing rotational direction of the motor 9, "stop" and "braking" representing stop and braking states thereof, respectively.

The PWM driving circuit 8 outputs one of control signals (pulse width modulation signals) PWM1, PWM2 and one of control signals F and R selectively in accordance with the rotational direction of the motor 9, that is, "forward rotation" or "reverse rotation", represented by the control signal D/O of the control signals PWM and D/O input in the circuit 8. That is, when the control signal D/O represents the "forward rotation", the PWM driving circuit 8 outputs the control signal PWM as the control signal PWM1 and the control signal F representing the forward rotation. The control signal F becomes always ON-state at the time of the forward rotation. In contrast, when the control signal D/O represents the "reverse rotation", the PWM driving circuit 8 outputs the control signal PWM as the control signal PWM2 and the control signal R representing the reverse rotation. The control signal R becomes always ON-state at the time of the reverse rotation.

An H-bridge type chopper main circuit 4, supplied with the control signals from the PWM driving circuit 8, is formed by power MOS FETs M1, M2 for PWM control and power MOS FETs M3, M4 for switching the rotational direction of the DC motor 9.

When the control signal D/O represents the "forward rotation" and the PWM control signal is in an ON-state, the PWM driving circuit 8 outputs the control signal PWM1 and the control signal F each in an ON-state to thereby turn on the power MOS FETs M1 and M4 of the H-bridge type chopper main circuit 4. The power supply voltage $V_B$ from a battery B is applied to the motor 9 through the power MOS FET M1, so that a motor current IF flows through the motor 9 and then returned to the battery B through the power MOS FET M4 and a shunt resistor 5. When the control signal PWM1 becomes OFF-state, the power MOS FET M1 is turned off. However, the power MOS FET M4 is kept in an ON-state since the control signal F representing the forward rotation is kept in an ON-state, so that a fly wheel current $I_{D3}$ flows from the power MOS FET M4 through a reverse diode of the power MOS FET M3 as the motor current $I_F$. Accordingly, the current flowing through the power MOS FET M1 serves as the motor current $I_F$ when the control signal PWM1 is in an ON-state, while the fly wheel current $I_{D3}$ flowing through the power MOS FET M3 serves as the motor current $I_F$ when the control signal PWM1 is in an OFF-state.

In contrast, when the control signal D/O represents the "reverse rotation" and the PWM control signal is in an ON-state, the PWM driving circuit 8 outputs the control signal PWM2 and the control signal R each in an ON-state to thereby turn on the power MOS FETs M2 and M3 of the H-bridge type chopper main circuit 4. The power supply voltage $V_B$ from the battery B is applied to the motor 9 through the power MOS FET M2, so that the motor current $I_F$ flows through the motor 9 and then returned to the battery B through the power MOS FET M3 and the shunt resistor 5. When the control signal PWM2 becomes OFF-state, the power MOS FET M2 is turned OFF. Thus, a fly wheel current $I_{D3}$ flows from the power MOS FET M3 through a reverse diode of the power MOS FET M4 as the motor current $I_F$. In this manner, at the time of the reverse rotation, the motor current $I_F$ flows through the motor 9 to the direction in opposite to the direction at the time of the forward rotation, so that the motor 9 can be rotated reversely.

The motor 9 is a DC motor. Alternately, the motor 9 may be a stepping motor. The motor 9 is coupled to the throttle valve 10 through a reduction gear, whereby the opening angle of the throttle valve 10 is controlled in a manner that the throttle valve 10 is opened by forwardly rotating the motor 9 and closed by reversely rotating the motor 9.

The detail of a power element current $I_D$ flowing through the shunt resistor 5 will be described later with reference to FIG. 3. The power element current $I_D$ is detected in the form of a shunt resistor voltage $V_D$ which is a voltage across the opposite ends of the shunt resistor 5 and then amplified by an amplifier 6. The one end of the shunt resistor 5 is grounded. The resistance value of the shunt resistor 5 is small since it is used for detecting current. Accordingly, the shunt resistor voltage $V_D$ is lower than the driving voltage of the amplifier 6, for example, 5 V, so that a normal amplifier instead of an expensive insulation-type current detector can be used as the amplifier 6. The output voltage $V_{DA}$, of the amplifier 6 is held by a sample hold circuit 12 which operates in synchronism with the control signal PWM output by the microcomputer 1. The output voltage $V_{DH}$ of the sample hold circuit 12 is input to an A/D input terminal of the microcomputer 1 and converted into a digital signal by the A/D converter contained in the microcomputer 1.

The power element current $I_D$ thus detected is compared with a control signal of the motor current obtained from a difference between the throttle valve opening angle command $TV_C$ and the throttle valve opening angle signal $T_{VF}$, and then the duty ratio of the control signal PWM is controlled so that the power element current $I_D$ coincides with the control signal of the motor current. In this manner, the feedback control of the motor current is performed.

In principle, the throttle valve opening angle can be controlled only by means of the feedback control based on the difference between the throttle valve opening angle command $T_{VC}$ and the throttle valve opening angle signal $T_{VF}$. However, in fact, when the external temperature changes, the voltage of the battery B also changes, so that the current flowing through the motor 9 changes with the change of the voltage of the battery B even if the control signal PWM output from the microcomputer 1 is constant. That is, when the battery voltage decreases, the current flowing through the motor decreases. Further, when the temperature of the motor changes, the resistance value of the coil of the motor 9 changes and hence the current flowing through the motor 9 also changes. Even when the current flowing through the motor changes in this manner, the throttle valve opening angle can be controlled with high accuracy by detecting the power element current $I_D$ and performing the feedback control based on the power element current $I_D$. In other word, even in the case where the control signal PWM output from the microcomputer 1 is constant, when the battery voltage decreases, the current flowing through the motor decreases. In this case, when the feedback control is performed in a manner that the current flowing through the motor is increased so as to compensate the decreased amount of the current flowing through the motor, the throttle valve opening angle can be controlled with high accuracy.

Figure 2:
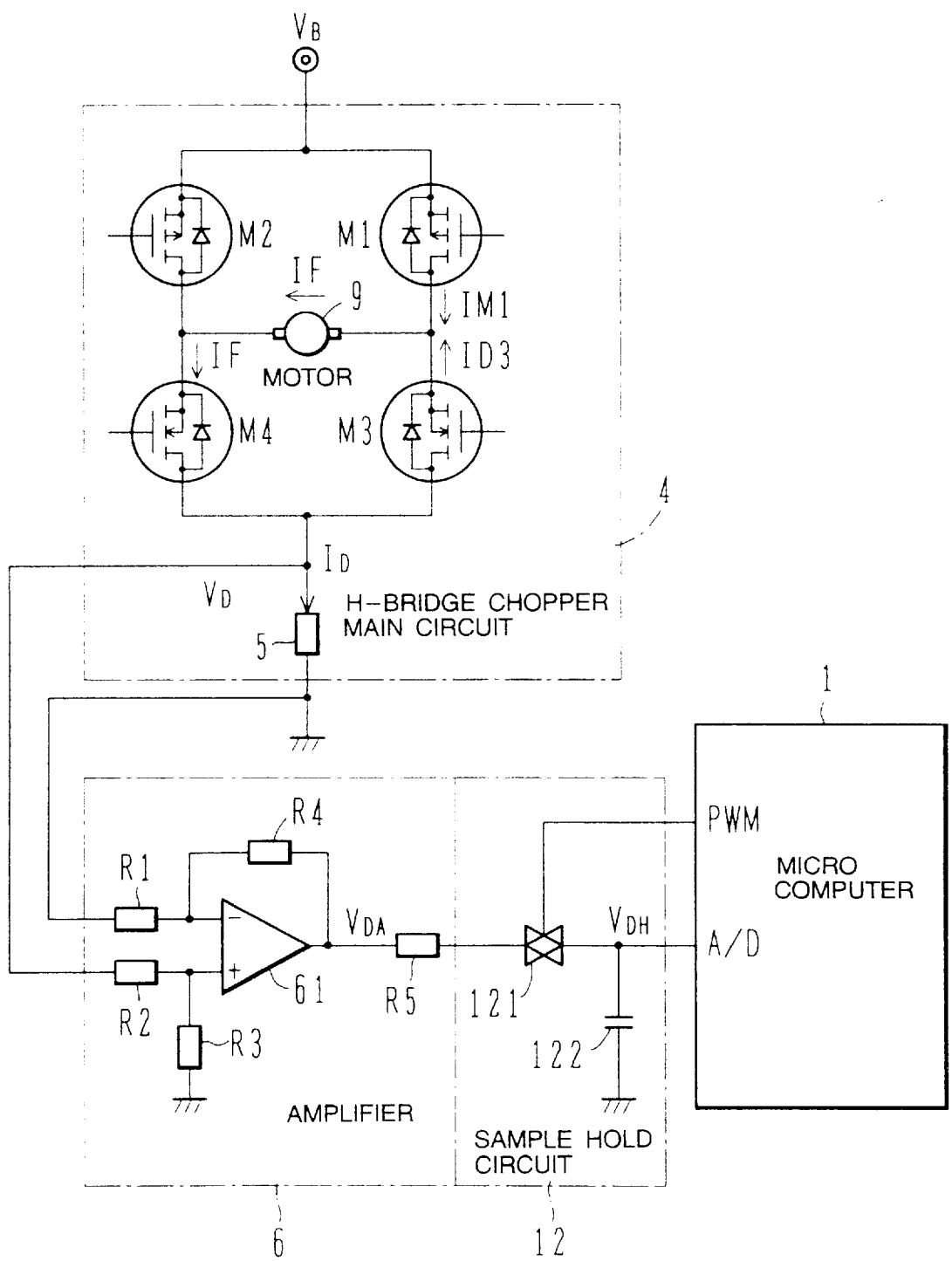
FIG. 2 is a circuit diagram showing the current detecting portion of the electronic throttle valve control apparatus according to the embodiment.

The circuit arrangement of the detecting portion of the power element current $I_D$ will be explained in detail with reference to FIGS. 2 and 3. In FIG. 2, like parts corresponding to those of FIG. 1 are marked with the same references and therefore the detailed explanation thereof will be omitted.

In FIG. 2, the power element current $I_D$ flowing through the shunt resistor 5 connected to the H-bridge type chopper main circuit 4 is taken into the amplifier 6 in the form of the shunt resistor voltage $V_D$. The amplifier 6 is formed by an operational amplifier 61, input resistors R1, R2, feedback resistors R3, R4 and an output resistor R5. The output voltage $V_{DA}$ of the amplifier 6 is input into the sample hold circuit 12. The sample hold circuit 12 is formed by an analog switch 121 and a capacitor 122. The analog switch 121 is turned on and off in synchronism with the control signal PWM from the microcomputer 1. The sample hold circuit 12 outputs the output signal of the amplifier 6 as it is when the analog switch 121 is in an ON state. In contrast, when the analog switch 121 is in an OFF state, the sample hold circuit 12 holds the voltage of the capacitor 122 which has been charged immediately before the turn-OFF of the analog switch 121.

In FIG. 1, the control signal PWM output by the microcomputer 1 is the same pulse signal as the control signals PWM1, PWM2 output from the PWM driving circuit 8. Accordingly, the control signal PWM1 or PWM2 output by the PWM driving circuit 8 may be employed as the signal for operating the analog switch 121 instead of the control signal PWM output by the microcomputer 1. In this case, the signal for operating the analog switch 121 may be obtained by logically ORing the control signal PWM1 and the control signal PWM2.

In any case, it is merely required that the analog switch is operated based on the PWM signal which is the control signal for the power element of the H-bridge type chopper main circuit to thereby sample and hold the power element current.

The theory for detecting the current on the basis of the respective current and voltage waveforms will be explained with reference to FIG. 3.

(A) of FIG. 3 shows the waveform of the control signal PWM from the microcomputer 1. Each of the control signals PWM1, PWM2 output from the PWM driving circuit 8 has the similar waveform to that of the control signal PWM. The control signal PWM is a pulse signal which is repetitively turned ON at the time t0 and turned OFF at the time t1 and then turned ON at the time t3 and then turned OFF at the time t4. The period T0 of this pulse signal is constant but the ON time period T1 thereof is variable. The duty ratio T1/T0 of the pulse signal is changed by changing the ON time period T1 in accordance with the difference between the throttle valve opening angle command $T_{VC}$ and the throttle valve opening angle signal $T_{VF}$. The period T0 of the pulse signal will be 50 $\mu$s when the PWM signal of 20 kHz is used.

(B) of FIG. 3 shows the waveform of the power element current $I_D$. The power element current $I_D$ starts to flow when the control signal PWM becomes in an ON state. At this time, an excessive current flows due to the influence of the recovery characteristics of the power MOS FETs etc. When the control signal PWM becomes in an OFF state, the power element current $I_D$ becomes zero upon the lapse of the time period T2 after the turning-OFF of the control signal PWM due to the operational delay of the power MOS FETs. The delay time T2 is about several $\mu$ seconds.

(C) of FIG. 3 shows the waveform of the shunt resister voltage $V_D$ representing the voltage across the shunt resistor 5, which slightly overshoots at the falling of the power element current $I_D$ due to the influence of a reactance L.

(D) of FIG. 3 shows the waveform of the output voltage $V_{DA}$ of the amplifier 6, which vibrates upon rising thereof at the time t0 and falls with time-delay at the time t2 due to the high-frequency characteristics of the operational amplifier. Such a phenomenon is caused because the PWM signal is the high-frequency signal of 20 kHz as described above.

Since the output voltage of the amplifier 6 is a voltage signal having the waveform shown in (D) of FIG. 3, the sample hold circuit 12 is employed at the time of taking the voltage signal into the microcomputer 1 so as to eliminate the influence of various fluctuations. The voltage signal is sampled and held by the sample hold circuit at the times t1 and t4. That is, the analog switch 121 of the sample hold circuit 12 is turned OFF in synchronism with the falling of the control signal PWM, and hence the output voltage $V_{DA}$ having been output from the amplifier 6 immediately before the turning-OFF of the switch 121 is held in the capacitor 122. Actually, since the control signal PWM is a pulse signal shown in (A) of FIG. 3, the analog switch 121 is turned OFF when the pulse signal is changed from the ON state to the OFF state, whereby the output voltage $V_{DA}$ having been output from the amplifier 6 immediately before the turning-OFF of the analog switch 121 is held in the capacitor 122.

Accordingly, as shown in (E) of FIG. 3, the current detection signal $V_{DH}$ from the sample hold circuit 12 is same in its waveform as that of the output voltage $V_{DA}$ of the amplifier 6 during the period from the time t0 to the time t1, and keeps the voltage value held by the capacitor 122 after the time t1.

As shown in (F) of FIG. 3, the A/D converter of the microcomputer 1 is externally triggered in synchronism with the falling of the control signal PWM and then the current detection signal $V_{DH}$ from the sample hold circuit 12 is taken into the A/D input terminal of the microcomputer 1. In this manner, since the timing for performing the A/D conversion is restricted, the variations of data due to the variations of the timing of the A/D conversion can be eliminated. The time period T3 required from the starting of the A/D conversion to the termination thereof differs depending on the value of the analog signal to be converted, but the time period T3 is in a range of several pseconds to several ten pseconds in this embodiment.

When the A/D conversion is terminated, the digital signal having been converted is taken into the body portion of the microcomputer 1 in the form of the microcomputer data (IDCURNT) as shown in (G) of FIG. 3.

(H) of FIG. 3 shows the waveform of the motor current $I_F$ flowing into the motor 9. The motor current $I_F$ flowing during the period from the time t0 to the time t1 corresponds to the current $I_{M1}$ flowing through the power MOS FET M1 in FIG. 1, and the motor current $I_F$ flowing during the period from the time t1 to the time t2 corresponds to the fly wheel current $I_{M3}$ flowing through the power MOS FET M3 in FIG. 1.

Accordingly, since the current value immediately before the turning-OFF of the chopper main circuit is taken, it is possible to detect the current value which is not influenced by the vibration of the current at the rising thereof.

In the case of performing the PWM control, the trigger signal may be delivered at the center of the ON period of the control signal PWM so that the current detection signal is taken into the A/D input terminal in response to the trigger signal. That is, when the control signal PWM is turned ON during the period from the time t0 to the time t1 as shown in (A) of FIG. 3, the current detection signal may be taken into the A/D input terminal at the timing of (t0+(t1−t0)/2). However, in this case, if the duty ratio of the control signal PWM becomes smaller, the timing for taking the signal into the A/D input terminal becomes closer to the rising timing of the control signal PWM since the ON period of the control signal PWM becomes smaller, whereby the current value to be detected is influenced by the vibration of the current detection signal at the rising thereof. In this case, like the present embodiment, when the A/D converter of the microcomputer 1 is externally triggered in synchronism with the falling of the control signal PWM so that the current detection signal is taken into the A/D input terminal of the microcomputer, the current value to be detected is not influenced by the vibration of the current detection signal at the rising thereof.

The detailed operation timings for explaining the theory for detecting the current by using the software processing will be described with reference to FIG. 4, and the flow chart of the software processing will be described with reference to FIGS. 5A and 5B.

(I) of FIG. 4 shows the timing for executing the task 0 of the software processing, and (J) of FIG. 4 shows the timing for executing other task of the software processing. As shown in (I) of FIG. 4, the program of the task 0 is executed at every 1 msec. The program of other task is executed after execution of the program of the task 0 as shown in (J) of FIG. 4.

Figure 5A:
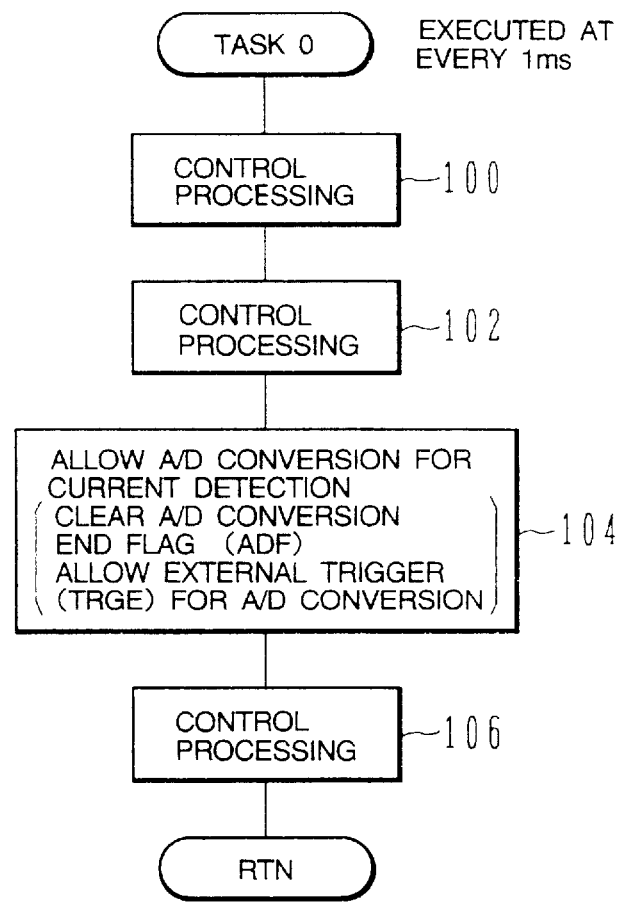
FIGS. 5A and 5B show flow charts used to explain the principle for current detection of the electronic throttle valve control apparatus according to the embodiment.
Figure 5B:
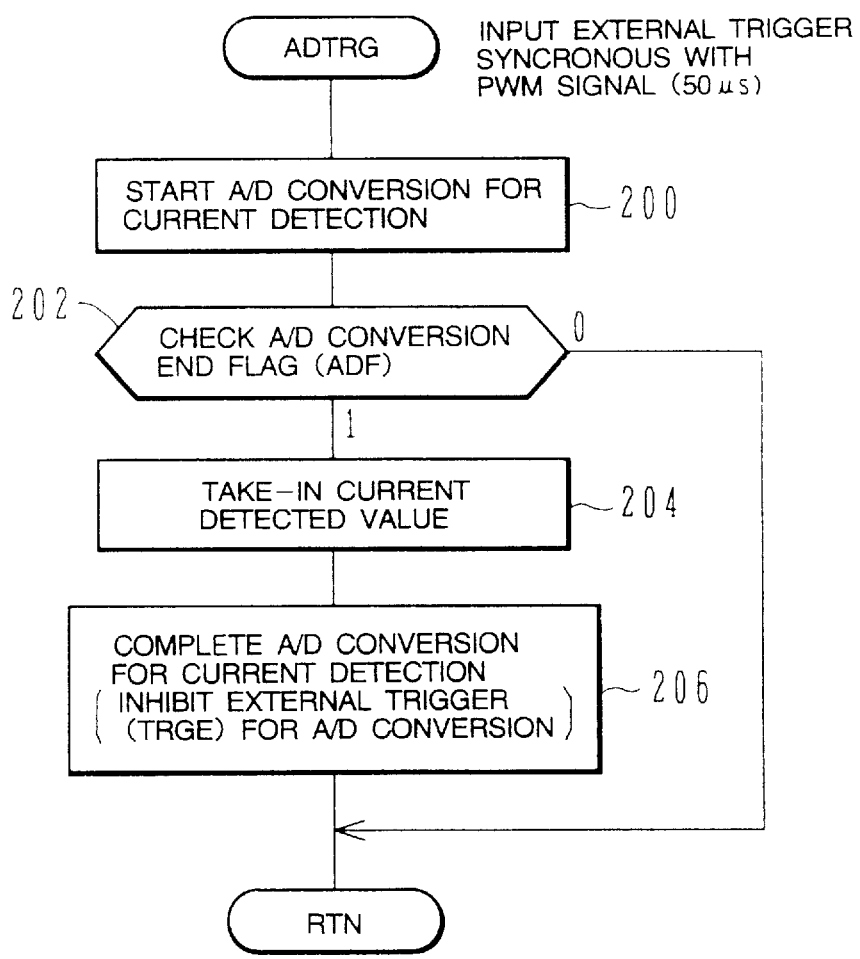

The program of the task 0 includes a plurality of processings as shown in FIG. 5A. That is, when the task 0 is started, a control processing 100 and a control processing 102 are sequentially executed, then the allowance of the A/D conversion for current detection is set in the processing 104. That is, as shown in (I) of FIG. 4, the allowance of taking the current detection signal into the A/D input terminal is set to thereby set the allowance of the application of the external trigger (TRGE) to the A/D converter of the microcomputer. At this time, the A/D conversion end flag is cleared to be 0. Thereafter, other control processing 106 is executed. Thus, the processing of FIG. 5A is completed and then other task is executed.

The control signal PWM generated from the hardware is asynchronous with the processing timing of the task 0 and the period of the control signal PWM is shorter than the processing time of the task 0. Accordingly, as shown in (A) of FIG. 4, when the external trigger is input in synchronous with the falling of the control signal PWM which is output upon the lapse of 50 μs after the allowance of the current taking-in, the ADTRG program for the external trigger of the A/D converter shown in FIG. 5B is started. In the ADTRG program, the A/D conversion for the current detection is started in a processing 200. When the A/D conversion is completed, the A/D conversion end flag becomes 1. Then, it is checked whether the A/D conversion end flag is 0 or 1 in a processing 202. When it is determined that the A/D conversion end flag is 1, the current detected value is taken into the body of the microcomputer in a processing 204 as shown in (F) of FIG. 4. Then, the processing for completing the A/D conversion for current detection is performed in a processing 206. In this processing, the external trigger (TRGE) for the A/D conversion is inhibited until the application of the external trigger (TRGE) to the A/D converter of the microcomputer is allowed. When the execution of the processing 206 is completed, the processing of FIG. 5B is completed.

When the operation based on the control signal PWM is performed with the period quite shorter than the execution period of the program, for example, 50 μs, the operation for taking the current into the microcomputer is executed by the software once per twenty operations based on the control signal PWM, that is, at every 1 ms. Although the period of the operation based on the control signal PWM is 50 μs, the period of the current detection is 1 ms which is quite longer than the period of the operation based on the control signal PWM. However, since the control processing using the detected current value is performed at every 1 ms, there arises no problem. In this manner, the instantaneous current value just before the turning-OFF of the chopper main circuit can be taken into the microcomputer. In the aforesaid explanation of FIG. 3, the explanation has been made that the current value for the A/D conversion is taken ((F) of FIG. 3) in correspondence with the control pulse PWM ((A) of FIG. 3). However, in fact, the current taking-in processing is executed once at every 20 times of the operation based on the control signal PWM, that is, at every 1 ms. The ripple factor of the output current of the chopper main circuit can be decreased by increasing the frequency of the control signals to the chopper main circuit, so that the current closer to the average current can be taken into the microcomputer.

(A) and (F) of FIG. 4 correspond to (A) and (F) of FIG. 3, respectively.

Figure 6:
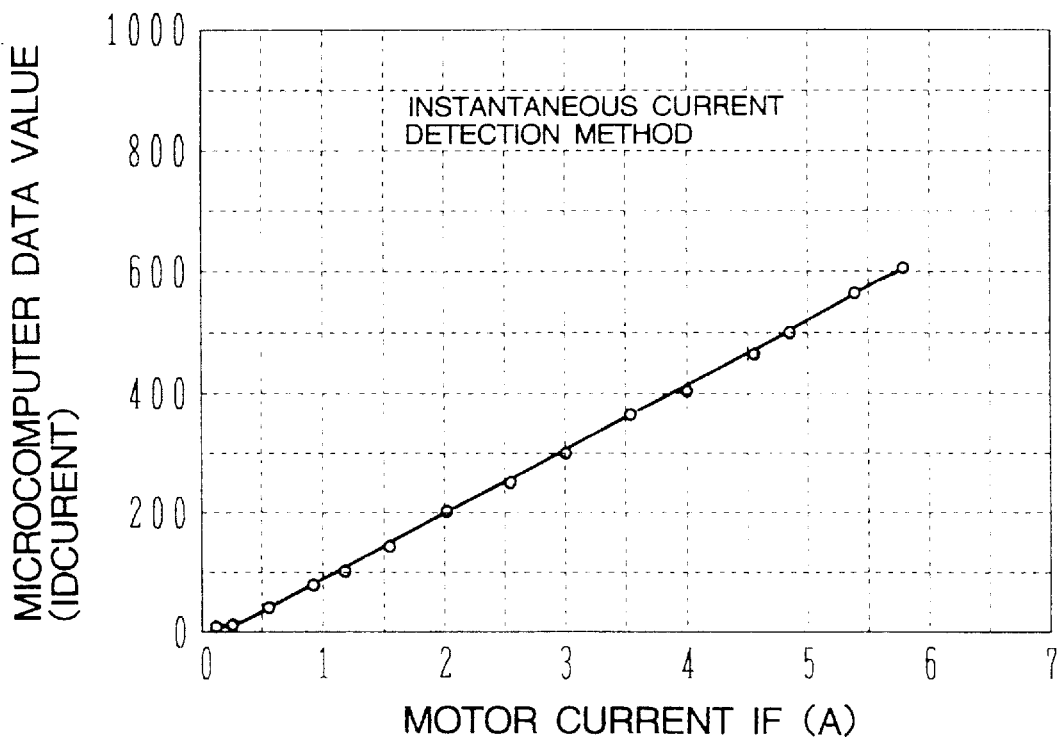
FIG. 6 is a graph showing the characteristics of a motor current detected by the electronic throttle valve control apparatus according to the embodiment.

FIG. 6 is a graph showing the characteristics of the motor current detected by the electronic throttle valve control apparatus according to the embodiment.

In this graph of the motor current characteristic, the abscissa represents the measured value of the motor current $I_F$ which is controlled by the microcomputer 1, and the ordinate represents the microcomputer data (IDCURNT) value which is obtained by converting the current value into the digital signal through the A/D converters contained in the sample hold circuit 12 and the microcomputer 1. The measured values of the motor current and the microcomputer data values are plotted in the graph.

As clear from FIG. 6, the measured motor current values maintain quite good linearity with the microcomputer data values in a range from the small current value to the large current value. Further, there are little variation in the detected microcomputer data values and so the microcomputer data values are almost plotted on the straight line in FIG. 6. Further, the motor current can be detected even in a range of 1 A or less.

In this embodiment, it will be clear that by detecting the intermittent power element current, the continuously changing motor current can be detected with good approximation to the power element current.

Figure 7:
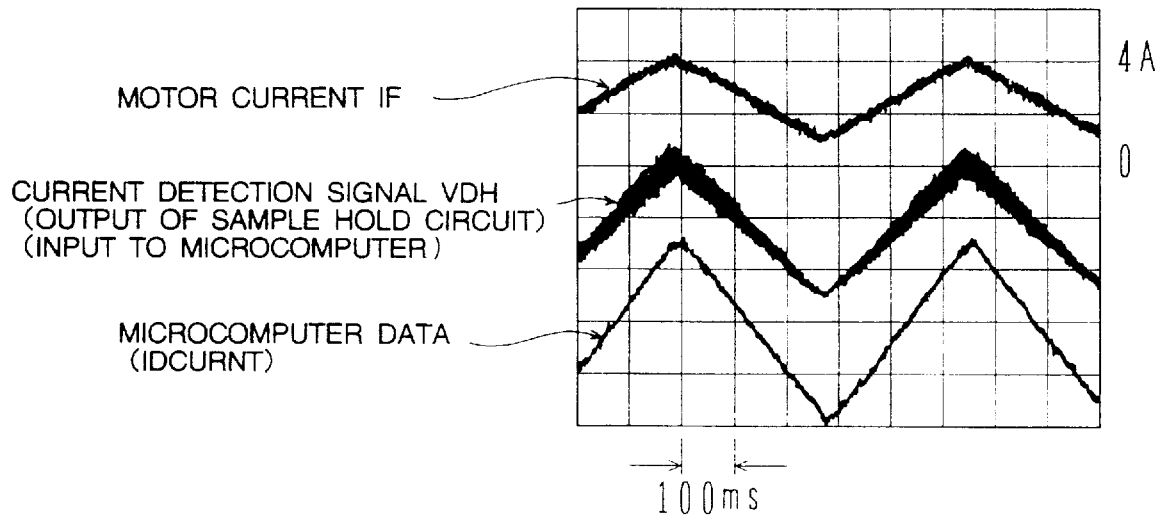
FIG. 7 is a diagram showing the waveform of the motor current detected by the electronic throttle valve control apparatus according to the embodiment.

FIG. 7 is a waveform diagram showing a relation between the current actually flowing into the motor 9 and the microcomputer data (ODCURNT) taken into the body of the microcomputer 1.

The command is applied to the microcomputer 1 so that the current flowing into the motor 9 will be the motor current $I_F$ shown at the upper portion in FIG. 7. That is, since one division of the abscissa in FIG. 7 is 100 ms, the command applied to the microcomputer is changed so that the motor current changes to form a rectangular waveform with a period of 550 ms. The middle portion in FIG. 7 shows the waveform of the output of the sample hold circuit 12, that is, the waveform of the current detection signal $V_{DH}$ input to the microcomputer 1. The current detection signal $V_{DH}$ changes to form a rectangular waveform like the motor current $I_F$ shown at the upper portion in FIG. 7. The current detection signal $V_{DH}$ is formed by superimposing the high frequency component on the rectangular waveform component. The high frequency component is the vibration component appeared immediately after the time points t0 and t3 of the current detection signal $V_{DN}$ shown in (E) of FIG. 3. The waveform of the microcomputer data converted into the digital signal in the microcomputer 1 is shown at the lower portion in FIG. 7. This microcomputer data is obtained through the A/D conversion of the output signal of the sample hold circuit 12 as shown in (F) of FIG. 3, so that the microcomputer data is not influenced by the high frequency component appearing in the current detection signal $V_{DH}$ shown in the middle portion of FIG. 7.

In this manner, since the motor current can be detected even in a low motor current range with good linearlity, it is possible to control the opening angle of the throttle valve with high accuracy in a small opening angle range of the throttle valve. Conventionally, as the throttle valve control devices of the valve control apparatus for an automobile, the electronic throttle valve control device for controlling the throttle valve by a motor and an idle speed control (ISC) device are constituted as separate and independent system. In the electronic throttle valve control device, the gain of the feedback loop is increased so as to increase the control speed thereof. In this case, however, since the idle speed control device is used for controlling the throttle valve in a small opening angle range in particular, the idle speed control device can not attain fine control of the throttle valve opening angle when the loop gain is too large. Accordingly, conventionally, it has been necessary to control the throttle valve opening angle by the electronic throttle valve control device and the idle speed control device independently. However, since it has become possible to control the throttle valve with high accuracy even in a low opening angle range, the idle speed control device can be used as a system contained in the electronic throttle valve control device. In this case, although the command from the ISC device has been applied to the throttle valve separately in the conventional electronic throttle valve control device, in this embodiment the command from the ISC device may be contained in the throttle valve opening angle command $T_{VC}$ shown in FIG. 1 so that the throttle valve opening angle control based on the idle speed control and the normal control can be performed commonly. In a system where the microcomputer 1 is controlled by a higher-rank microcomputer for controlling an engine, the throttle valve opening angle control can be performed by incorporating the control command for the ISC together with the normal throttle valve control command into the digital control command applied to the microcomputer 1 from the higher-rank microcomputer for the engine control.

According to the embodiment, the feedback control is performed by easily detecting the current flowing into the motor for driving the valve.

Since the instantaneous value of the power element current is detected, the linearlity of the detected motor current can be made quite good in a range from the small current value to the large current value.

Further, since the A/D conversion is started in response to the external trigger signal synchronous with the PWM signal, the timing for taking the current into the microcomputer is not so deviated and hence there is little variation in the detected motor current value.

Further, it is possible to detect the motor current in a small value range of 1 A or less.

Since the throttle valve opening angle can be controlled with high accuracy, the electronic throttle valve control device and the idle speed control (ISC) device can be constituted as a single system.

Furthermore, since the ripple factor of the output current of the chopper main circuit can be decreased by increasing the frequency of the control signals to the chopper main circuit, the current closer to the average current can be taken into the microcomputer.

While, in the embodiment of FIG. 1, the output voltage of the amplifier is sampled and held by using the sample hold circuit 12, a smoothing filter circuit may be used in place of the sample hold circuit. In this case, the output of the smoothing filter circuit will be the smoothed signal of the current detection signal $V_{DH}$ shown in (E) of FIG. 3. When such a smoothed voltage is taken into the microcomputer 1 through the A/D converter, the current flowing into the motor for driving the valve can be detected easily and the feedback control can be performed based on the detected current. Further, in this case, the detected microcomputer data is not the instantaneous value of the current detection signal $V_{DH}$ but the average value thereof, and so the microcomputer data will not be able to maintain such a good linearlity as shown in FIG. 6. However, it is possible to detect the current flowing into the motor without using a special detector such as an insulation-type current detector.

In the aforesaid embodiment, while, the explanation has been made as to the case where the present invention is applied to the apparatus for controlling the opening angle of the throttle valve as an example of the valve control apparatus for an automobile, the present invention is not limited thereto and may also be applied to the control apparatus for a valve for the exhaust gas recirculation (EGR) system, a valve for the traction control system having a tandem valve provided at the throttle body or the like as the valve control apparatus for an automobile.

Further, while, in the aforesaid embodiment, the explanation has been made as to the case where the A/D converter for converting the output voltage of the sample hold circuit into the digital signal is incorporated in the microcomputer, the A/D converter discretely provided outside of the microcomputer may be used instead of the A/D converter contained in the microcomputer. In this case, the external trigger signal may be output from the microcomputer so that the A/D converter starts the A/D conversion in synchronism with the trigger signal.

In the system where the microcomputer 1 outputs the data value relating to the duty ratio of the PWM signal and the PWM driving circuit outputs the pulse signals based on the data value as the control signals PWM1, PWM2, the analog switch 121 may be operated in accordance with a signal obtained by ORing the control signals PWM1, PWM2. In this case, the signal obtained by ORing the control signals PWM1, PWM2 output from the PWM driving circuit may be used as the external trigger signal for the A/D converter.

Further, while, in the aforesaid embodiment, the output signal of the amplifier is sampled and held and then A/D converted in synchronism with the falling of the pulse of the control signal PWM, the timing of the external trigger for the A/D conversion is not limited thereto, and the output signal of the amplifier is sampled and held and then A/D converted in synchronism with the center portion of the pulse of the control signal PWM.

As described above, according to the valve control apparatus for an automobile of the present invention, the current flowing into the motor for driving the valve can be detected easily and hence the feedback control can be performed based on the detected current.

Further, according to the present invention, the opening angle of the valve can be controlled with high accuracy.

An embodiment of the electronic throttle valve control apparatus for an automobile to which the valve control apparatus according to the present invention is applied will be described with reference to FIGS. 8 to 14.

The electronic throttle valve control apparatus according to the embodiment is formed by three control systems.

Figure 8:
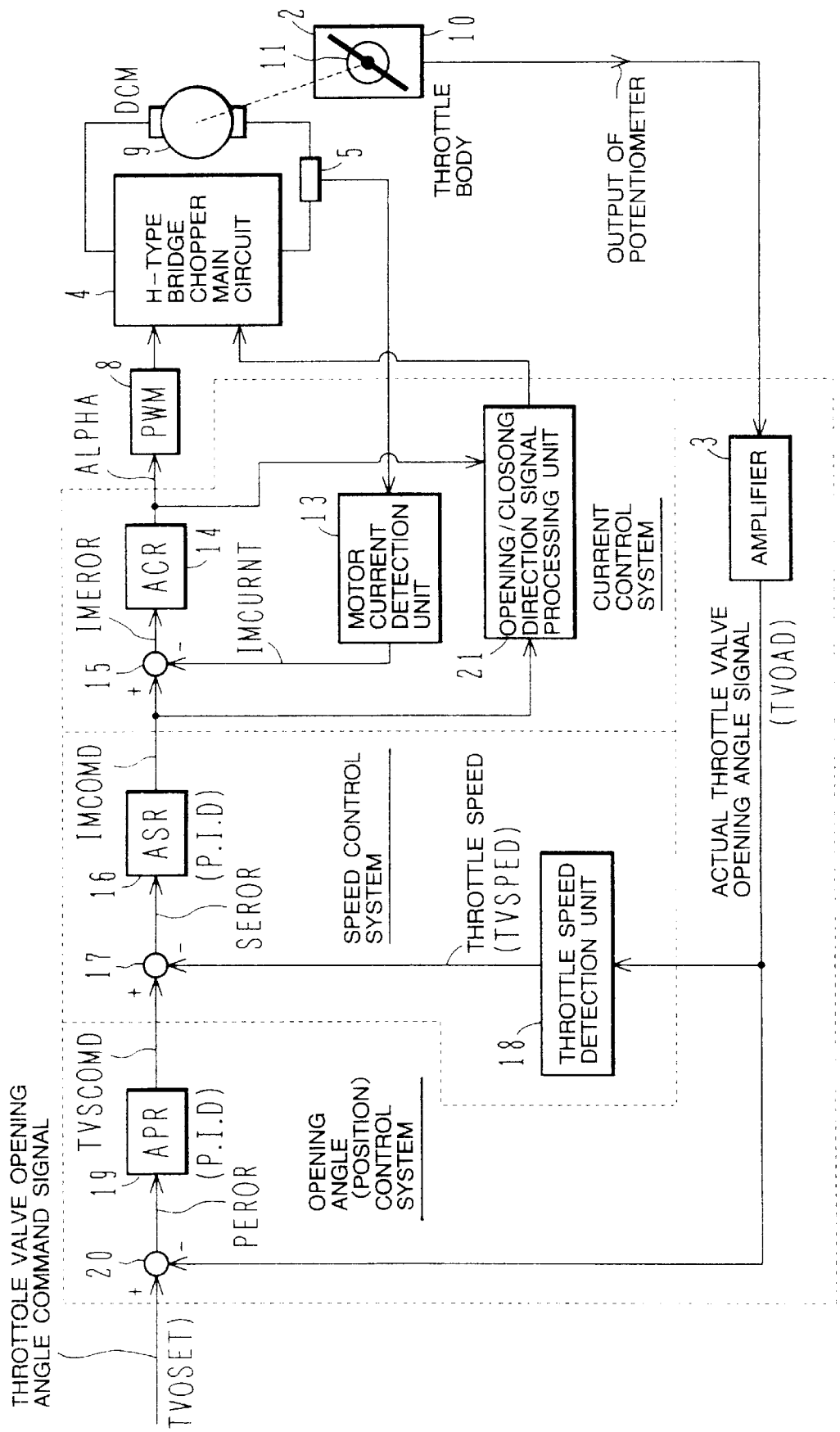
FIG. 8 is a block diagram showing an embodiment of the electronic throttle valve control apparatus for an automobile to which the valve control apparatus according to the present invention is applied.

As shown in FIG. 8 which illustrates the entire configuration of the electronic throttle valve control apparatus according to the embodiment, one of the three control systems is a current control system which compares an actual current value IMCURNT flowing through the motor 9 with a current command value IMCOMD to obtain a deviation IMEROR and outputs a duty command value ALPHA to the PWM driving circuit 8 based on the deviation IMEROR. The current control system includes a motor current detection unit 13 which detects the terminal voltage across the shunt resistor 5 connected in series with the motor 9 and detects the actual motor current IMCURNT from the detected terminal voltage, as described above. The current control system further includes a deviation calculation unit 15 for comparing the actual current value IMCURNT with the current command value IMCOMD to obtain the deviation IMEROR, and a compensation calculation unit (ACR) 14 which outputs a PWM duty signal serving as the duty command value ALPHA necessary for making the deviation IMEROR zero to the PWM driving circuit 8.

The current control system furthermore includes an opening/closing direction signal processing unit 21 for determining the opening/closing direction of the throttle valve based on the current command value IMCOMD and the PWM duty signal ALPHA calculated by the compensation calculation unit 14.

Figure 9:
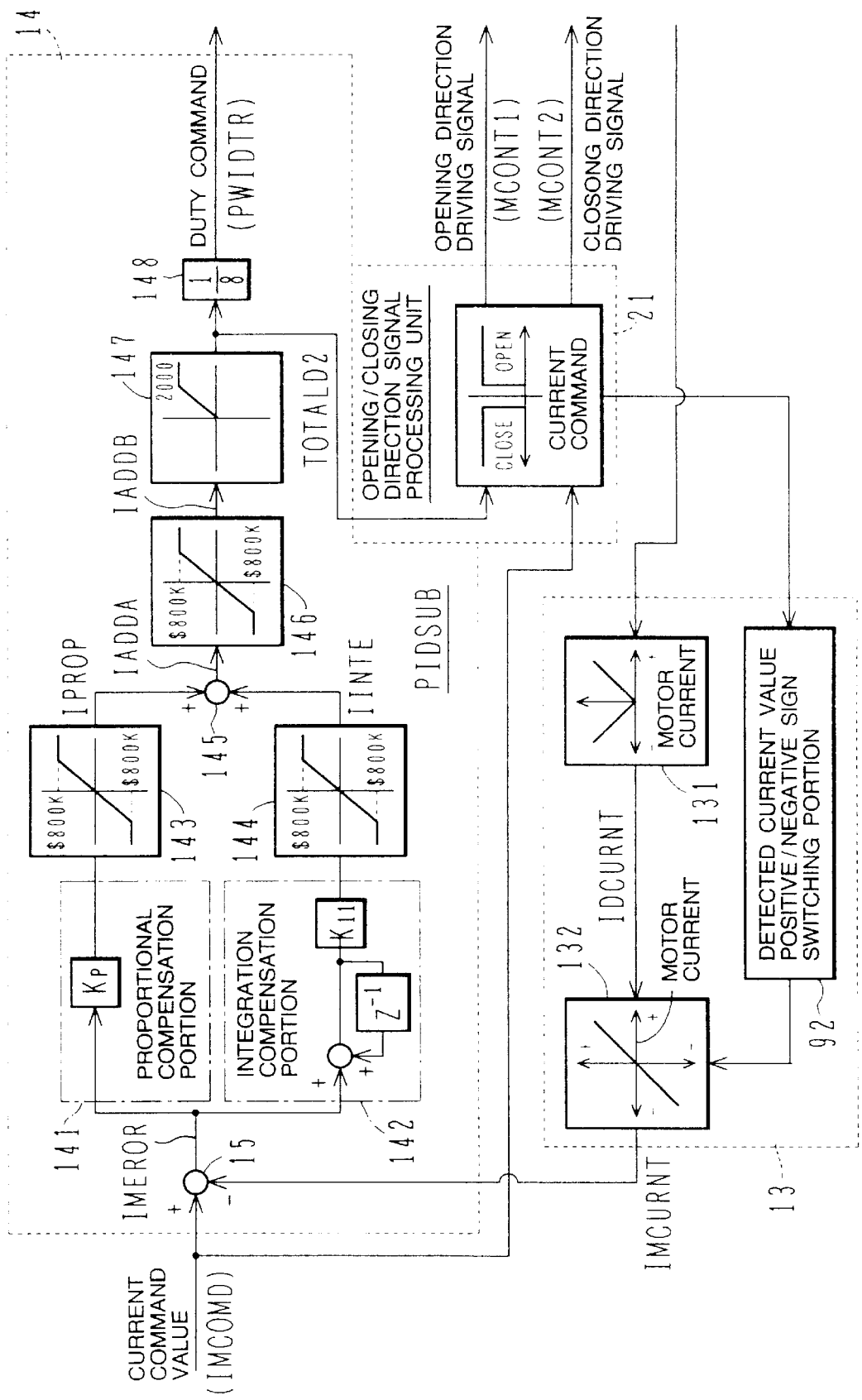
FIG. 9 is a block diagram showing the detailed configuration of a current control system in FIG. 8.

The detailed configuration of the current control system is shown in FIG. 9. As shown in FIG. 9, the compensation calculation unit (ACR) 14 includes a proportional compensation portion 141 for calculating a proportional compensation component from the deviation IMEROR, an integration compensation portion 142 for calculating an integration compensation component from the deviation IMEROR, limiters 143 and 144 for limiting the upper and lower values of the proportional compensation component and the integration compensation component, respectively, an adding portion 145 for obtaining the sum of output values IPROP and IINTE of the limiters 143 and 144, a limiter 146 for limiting the upper and lower values of the output IADDA of the adding portion 145, an absolute value calculation portion 147 for calculating an absolute value TOTALD2 of the output IADDB from the limiter 146, and a calculation value conversion portion 148 for adding a predetermined constant $\frac{1}{8}$ to the absolute value TOTALD2 to thereby outputs the PWM duty command value ALPHA and a PWM duty PWIDTR.

The opening/closing direction signal processing unit 21 determines the driving direction of the motor based on the current command value IMCOMD and the absolute value (the result of the proportional plus integral calculation) TOTALD2 and outputs the result of the determination to the motor current detection unit 13, and further obtains an opening direction driving signal MCONT1 for the throttle valve, a closing direction driving signal MCONT2 for the throttle valve and a stop signal for the motor based on the result of the determination and then outputs these signals to the H-bridge type chopper main circuit 4.

In the motor current detection unit 13, since a detected current value IDCURNT is detected in the form of negative sign by a motor current detection portion 131, a sign conversion portion 132 is operated by the output of a detected current value positive/negative sign switching portion 92 in accordance with the determination result from the opening/closing direction signal processing unit 21 to thereby convert the sign of the detected current value IDCURNT.

In FIG. 9, Kp represents a proportional constant for the proportional compensation calculation, K11 an integration constant for the integration compensation calculation, and $z^{-1}$ is an integration constant for the integration compensation calculation. The constants Kp and K11 provide the gains of the control system.

Numerals shown in the blocks of the limiters 143, 144, 146 and the absolute value calculation portion 147 represent the upper and lower limit values of the calculated values.

Figure 14:
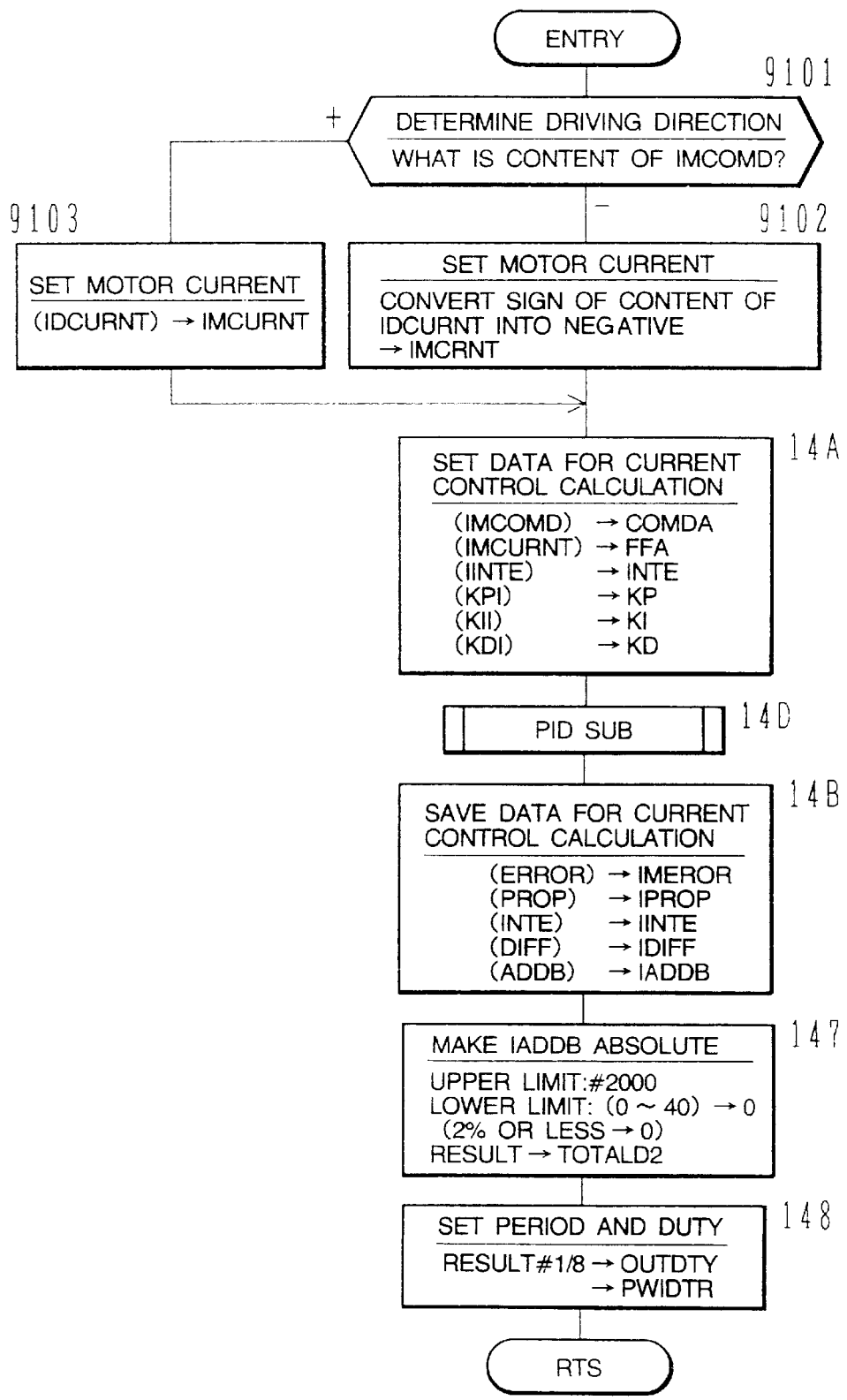
FIG. 14 is a flow chart showing the processing performed in the arrangement in FIG. 9.

In the arrangement of FIG. 9, the calculation processing performed in the compensation calculation unit 14 etc. is executed by the microcomputer 1. FIG. 14 is a flow chart for explaining the processing performed in the arrangement in FIG. 9.

Referring to FIG. 14, when the execution of the program is started, at first, it is checked whether the sign of the current command value IMCOMD is positive or negative to thereby determine the driving direction of the throttle valve in step 9101. When it is determined that the current command value is positive, the detected current value IDCURNT is set as it is in an area IMCURNT of a memory (not shown) as the motor current value in step 9103. When it is determined that the current command value is negative, the sign of the detected current value IDCURNT is converted into negative and then the converted current value is set in an area IMCURNT of the memory in step 9102, and thereafter the processing proceeds to step 14A.

Figure 12:
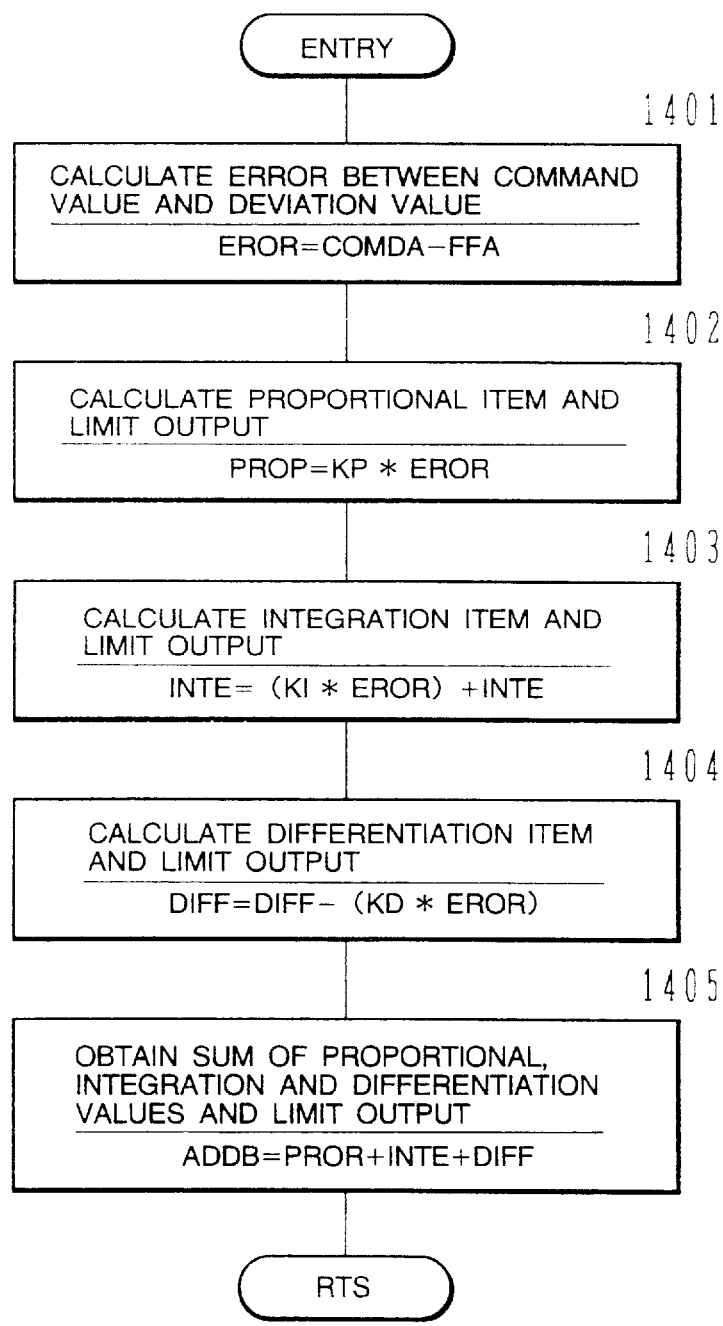
FIG. 12 is a flow chart showing the subroutine for the proportional plus integral plus derivative calculation.

In step 14A, data is set so as to execute the current control calculation in accordance with the subroutine (PID SUB)

flow chart shown in FIG. 12. For example, the motor current command value IMCOMD is set in an area COMDA and the proportional constant KP1 for the current compensation calculation is set in an area KP of the memory.

Similarly, an integration constant value Z (not shown) is set in an area Z012 of the memory, an integration value IINTE is set in an area INTE of the memory, the integration constant K11 is set in an area KI of the memory, and a differentiation constant KD1 is set in an area KD of the memory. The differentiation constant KD1 is not used in this embodiment since the current control responsibility is high (that is, a time constant is small) in the current control system.

In the next step 14D, the subroutine PIDSUB for the proportional plus integral plus derivative calculation is executed. That is, the processing shown in FIG. 12 is executed. Upon completion of the proportional plus integral plus derivative calculation, the data for the current control calculation is saved in step 14B. For example, the calculation result of a deviation ERROR obtained in the subroutine is saved in an area IMEROR corresponding to the current deviation and the calculation result of a control output value ADDB is saved in an area IADDB corresponding to the current control output value.

In step 147, the current control output value IADDB is made an absolute value, and in step 148 the period and the duty for the PWM control are set in registers PW1DTR and OUTDTY of the microcomputer, respectively, then the compensation calculation for the current control is ended.

The aforesaid subroutine PIDSUB for the proportional plus integral plus derivative calculation shown in step 14D will be described with reference to FIG. 12. This subroutine can be commonly used as the proportional plus integral plus derivative calculation portions for the speed calculation of the throttle valve and the opening angle calculation thereof. That is, the calculation flow chart can be used for the respective calculation portions so long as the constants, time constant and limit values are replaced for each calculation. The respective calculations can be executed in synchronism with the timing for taking the related input signal or can be periodically executed in response to the timer interruption. The result of the calculation is stored in a predetermined area of the memory, and read out therefrom and used at the time of performing other determining processing and other calculation processing. The respective values stored in the memory are always updated by newly calculated values.

When the program of the subroutine PIDSUB is started, the deviation ERROR between the motor current command value COMDA and the feedback value FFA is calculated in step 1401, then the proportional gain Kp is multiplied by the deviation ERROR to obtain a proportional item PROP and the output thereof is limited so as not to overflow in step 1402. Then, in step 1403, an integration gain K1 is multiplied by the deviation EROR to obtain the multiplied value, which is then added to a previous integration calculation value INTE to obtain a current integration calculation value INTE and the output thereof is limited. Thereafter, in step 1404, a differentiation gain KD is multiplied by the deviation EROR to obtain the differentiated value, which is then subtracted from a previous differentiation calculation value DIFF to obtain current differentiation calculation value DIFF and the output thereof is also limited. At last, in step 1405, the sum of the thus obtained proportional calculation value PROP, integration calculation value INTE and differentiation calculation value DIFF is output as the control output value ADDB, thereby completing the proportional plus integral plus derivative calculation PIDSUB.

Figure 13:
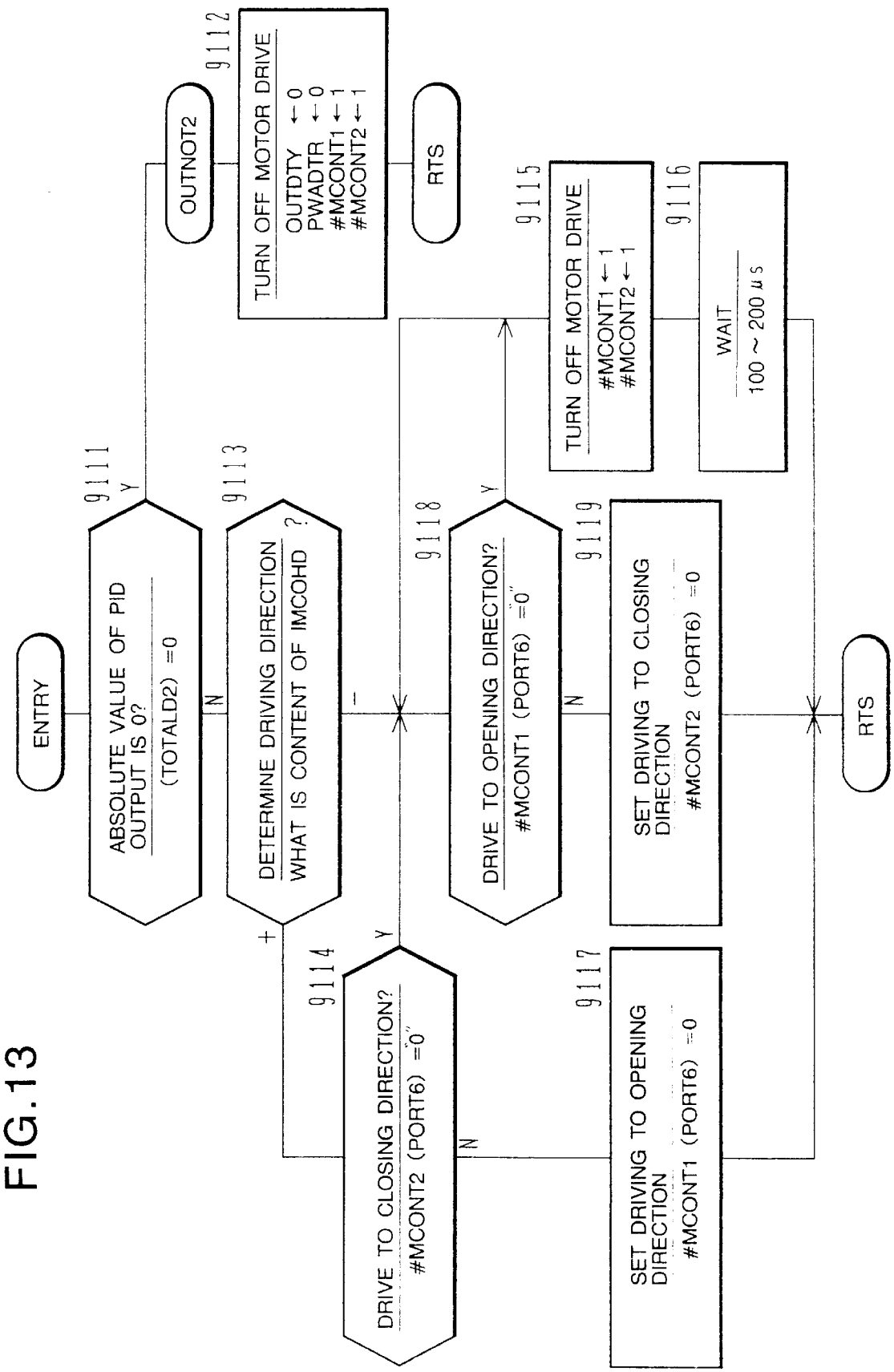
FIG. 13 is a flow chart showing the operation of a opening/closing direction signal processing unit.

The operation of the opening/closing direction signal processing unit 21 will be described with reference to the flow chart shown in FIG. 13. In step 9111, it is determined whether the output of the proportional plus integral plus differentiation calculation TOTALD2 is "0" or not. When it is determined that the output TOTALD2 is "0", the processing proceeds to step 9112, whereat the processing for stopping the motor is performed. That is, the duty "0" is set in the resistor OUTDTY of the microcomputer, for example, then the operation is ended.

In contrast, when it is determined that the output TOTALD2 is not "0", the processing proceeds to step 9113, whereat the driving direction is determined on the basis of the sign of the current command value IMCOMD. When the sign of the current command value IMCOMD is positive (+), the processing proceeds to step 9114, whereat it is determined whether the closing direction driving is to be performed on the basis of the flag. When it is determined that the closing direction driving is to be performed in step 9114, the processing proceeds to step 9115, whereat the signal "1" for turning OFF the motor is set and then short-circuit preventing time (100 to 200 μs) upon chopper switching of the power portion is secured in step 9116, then the operation is ended. In contrast, when it is determined that the opening direction driving is to be performed in step 9114, the processing proceeds to step 9117, whereat the opening direction driving flag is set to thereby maintain the opening direction state, then the operation is ended.

When it is determined that the sign of the current command value IMCOMD is negative (−) in step 9113, the processing proceeds to step 9118, whereat it is determined whether or not the opening direction driving is to be performed. When it is determined that the opening direction driving is to be performed in step 9118, the processing proceeds to step 9115; whereat the motor is stopped. In contrast, when it is determined that the closing direction driving is to be performed in step 9118, the processing proceeds to step 9119, whereat the closing direction driving flag is set to thereby maintain the closing direction state, then the operation is ended.

According to the aforesaid embodiment, the motor current can be controlled at the time of controlling the throttle valve opening angle, and the variation of the current due to the change of the value of the winding resistor of the motor caused by the temperature change can be suppressed, so that the stability and the accuracy of the throttle valve control can be improved.

Another of the three control systems is a speed control system of the throttle valve. The speed control system has a function that a correction value obtained by taking the opening/closing speed of the throttle valve into consideration is added to the throttle valve opening angle command value to thereby eliminate the overshoot phenomenon at the time of controlling the opening angle of the throttle valve and decrease the time required for the throttle valve to reach the target opening angle as much as possible.

Figure 10:
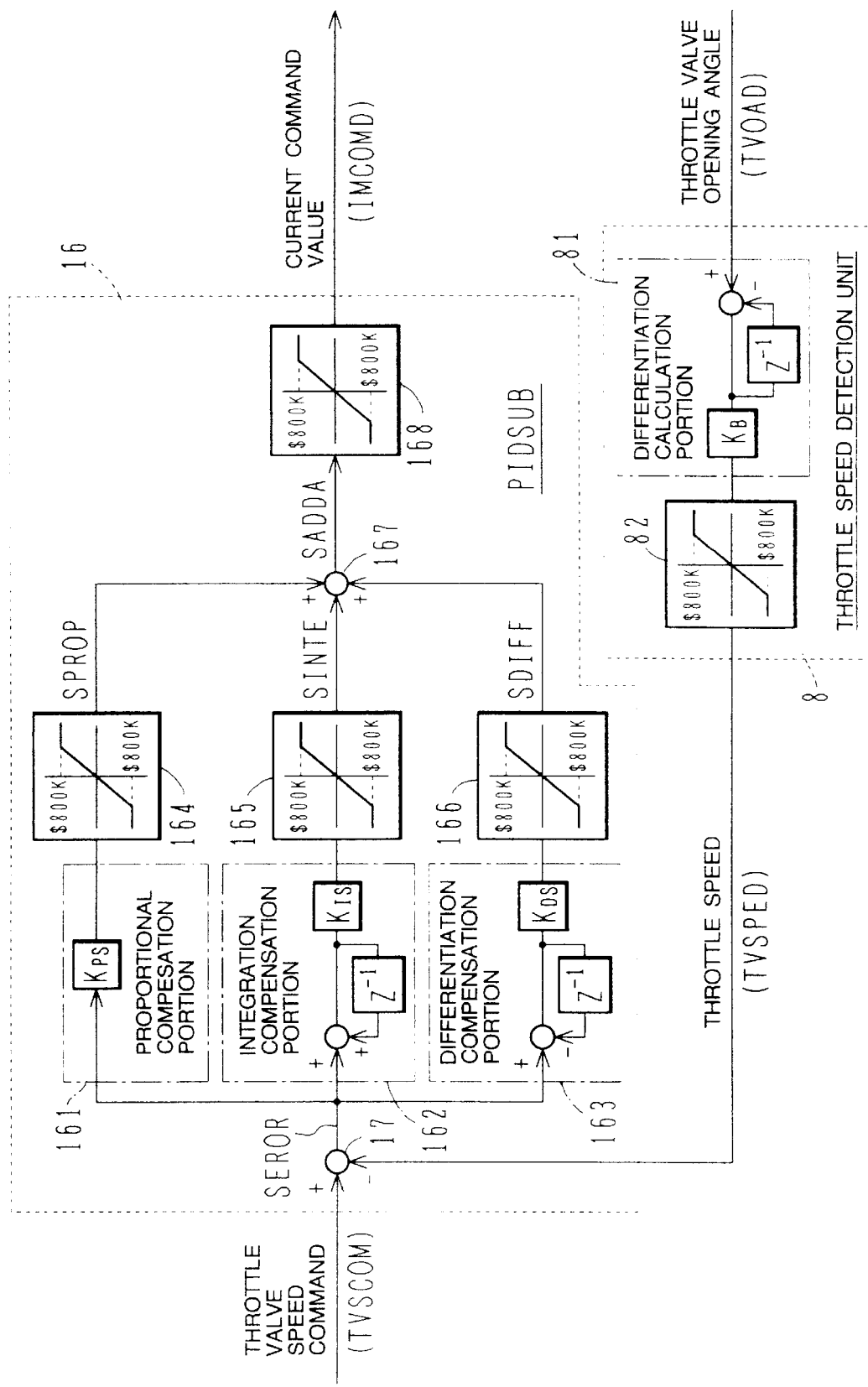
FIG. 10 is a block diagram showing the detailed configuration of a speed control system in FIG. 8.

The speed control system has the following functional blocks as shown in FIG. 10. That is, the speed control system has the throttle speed detection unit 18 in which a differentiation calculation portion 81 differentiates the actual throttle valve opening angle signal TVOAD representing the actual throttle valve opening angle to detect the changing rate of the opening angle of the throttle valve to thereby obtain the changing speed of the opening angle of the throttle valve. A limiter 82 of the throttle speed detection unit 18 limits the upper and lower values of the differentiated value from the differentiation calculation portion 81. The speed control system further includes a speed deviation calculation unit 17 which compares the obtained actual throttle valve opening/closing speed TVSPED with a throttle valve speed command TVSCOM to obtain a deviation SEROR.

The deviation SEROR is applied to a proportional compensation portion 161 and the result of the calculation from the proportional compensation portion 161 is applied to an adding portion 167 through a limiter 164. The deviation SEROR is also applied to an integration compensation portion 162 and the result of the calculation from the integration compensation portion 162 is applied to the adding portion 167 through a limiter 165. Further, the deviation SEROR is also applied to a differentiation compensation portion 163 and the result of the calculation from the differentiation compensation portion 163 is applied to the adding portion 167 through a limiter 166. The sum SADDA of the values SPROP, SINTE and SDIFF from the limiters 164, 165, 166 is input to the aforesaid current control system through a limiter 168 as the current command value IMCOMD.

In FIG. 10, Ks, Kps, $K_{IS}$, $K_{DS}$ represent calculation constants and $Z^{-1}$ represents a calculation time constant.

Numerals shown in the blocks of the limiters 164, 165, 166, 168 represent upper and lower limit values of the calculation values. The calculation performed in a throttle speed compensation calculation unit PIDSUB 16 of the speed control system is also executed by the microcomputer based on the subroutine shown in FIG. 12.

The remaining one of the three control systems is a throttle valve opening angle (position) control system. The throttle valve opening angle (position) control system includes a comparison calculation unit 20 which compares a throttle valve opening angle command signal TVOSET sent from an engine control unit (not shown) of the automobile with the actual throttle valve opening angle signal TVOAD to obtain a deviation signal PEROR. A proportional compensation portion 61, an integration compensation portion 62 and a differentiation compensation portion 63 calculate a proportional item, an integration item and a differentiation item based on the deviation signal PEROR output from the comparison calculation unit 20, respectively. The proportional item, integration item and differentiation item are sent to an adding portion 67 through limiters 64, 65 and 66, respectively. The adding portion 67 obtains the sum PADDA of the proportional item PPROP, integration item PINTE and differentiation item PDIFF and outputs the sum to the throttle speed control system through a limiter 68 as the throttle valve speed command TVSCOM.

Figure 11:
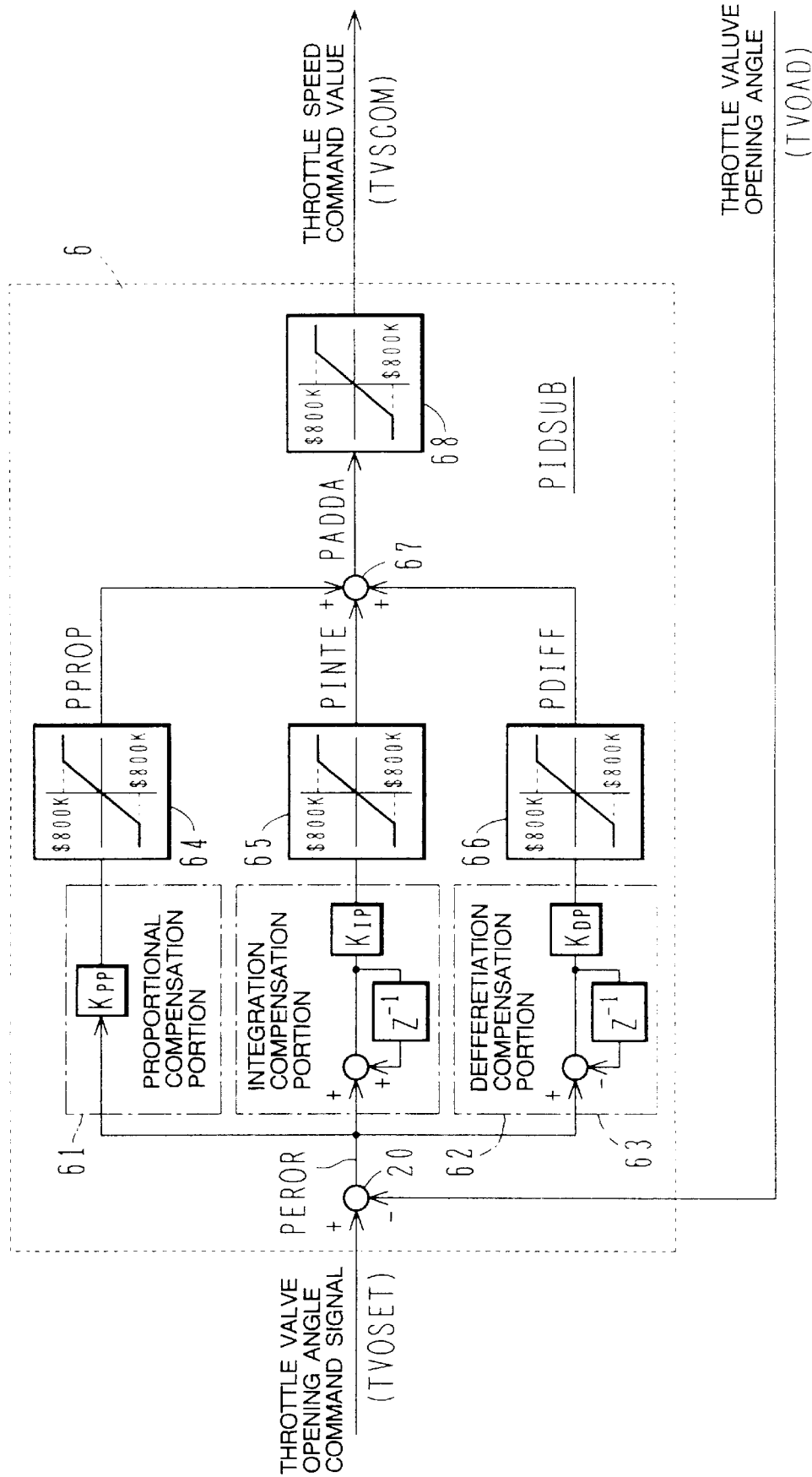
FIG. 11 is a block diagram showing the detailed configuration of an opening angle control system in FIG. 8.

In FIG. 11, $K_{PP}$, $K_{PP}$, $K_{DP}$ represent calculation constants of the throttle valve opening angle compensation portions 61, 62, 63 and provide compensation gains for the proportional, integration and differentiation items, respectively. Further, Z represents a time constant. Furthermore, numerals shown in the blocks of the limiters 64, 65, 66, 68 represent the upper and lower limit values of the calculated values.

The calculation performed in a throttle opening angle compensation calculation unit PIDSUB 19 of the speed control system is also executed by the microcomputer based on the subroutine shown in FIG. 12.

As described above, this embodiment includes the feedback loop for controlling the current supplied to the motor as well as the feedback loop for controlling the opening angle of the throttle valve, so that the throttle valve control apparatus can not be influenced by the change of the value of the winding resistor of the motor and the change of the battery voltage caused by the temperature change.

What is claimed is:

1. A valve control apparatus for an automobile comprising:

a valve;

a motor for driving said valve;

a chopper circuit for subjecting a current flowing into said motor to chopper control to thereby control rotation of said motor;

a pulse width modulation driving circuit for supplying a pulse-width-modulated control signal to said chopper circuit;

a control means for supplying said control signal to said pulse width modulation driving circuit to control an opening angle of said valve; and a current detection means for detecting a current from a power element constituting said chopper circuit which intermittently changes in accordance with said pulse-width-modulated control signal, wherein said control means changes said control signal supplied to said pulse width modulation driving circuit on the basis of said current detected by said current detection means to thereby control said opening angle of said valve; wherein said current detection means includes a resistor for current detection connected in series with said chopper circuit, and an analog to digital converting means for converting a terminal voltage across said resistor for current detection into a digital signal in accordance with said control signal, and said current detection means detects said terminal voltage in synchronism with a falling of a pulse of said pulse-width-modulated control signal.

2. A valve control apparatus for an automobile according to claim 1, wherein said current detection means further includes a sample hold circuit for sampling and holding said terminal voltage across said resistor for current detection in accordance with said control signal, wherein said analog to digital converting means converts said terminal voltage sampled and held by said sample and hold circuit into said digital signal in accordance with said control signal.

3. A valve control apparatus for an automobile according to claim 1, wherein said analog to digital converting means starts converting said terminal voltage into said digital signal in synchronism with a falling of a pulse of said pulse-width-modulated control signal.

4. A valve control apparatus for an automobile comprising:

a valve;

a motor for driving said valve;

a chopper circuit for subjecting a current flowing into said motor to chopper control to thereby control rotation of said motor;

a pulse width modulation driving circuit for supplying a pulse-width-modulated control signal to said chopper circuit;

a control means for supplying said control signal to said pulse width modulation driving circuit to control an opening angle of said valve;

a current detection means for detecting a current flowing through a power element constituting said chopper circuit; and a valve opening angle detecting means for detecting an opening angle of said valve, wherein said control means controls said opening angle of said valve in accordance with a command of an opening angle of said valve input therein and the opening angle detected by said valve opening angle detecting means, and further changes said control signal supplied to said pulse width modulation driving circuit on the basis of said current detected by said current detection means to thereby control said opening angle of said valve;

wherein said current detection means includes a resistor for current detection connected in series with said chopper circuit, and an analog to digital converting means for converting a terminal voltage across said resistor for current detection into a digital signal in accordance with said control signal; and said current detection means detects said terminal voltage in synchronism with a falling of a pulse of said pulse-width-modulated control signal.

5. A valve control apparatus for an automobile according to claim 4, wherein said current detection means further includes a sample hold circuit for sampling and holding said terminal voltage across said resistor for current detection in accordance with said control signal, wherein said analog to digital converting means converts said terminal voltage sampled and held by said sample and hold circuit into said digital signal in accordance with said control signal.

6. A valve control apparatus for an automobile according to claim 4, wherein said analog to digital converting means starts converting said terminal voltage into said digital signal in synchronism with a falling of a pulse of said pulse-width-modulated control signal.

7. An electrically controlled throttle valve apparatus for an automobile having double feedback system, comprising:

a control means for receiving as inputs a throttle valve opening angle command value corresponding to a depression degree of an accelerator pedal and a detected actual opening degree of said throttle valve, and for producing a PWM control signal for driving a throttle valve driving motor; and a PWM control signal compensating means for detecting an actual current flowing through said throttle valve driving motor, and for compensating said PWM control signal in response to said actual current value and said PWM control signal value.

8. An electrically controlled throttle valve apparatus according to claim 7, further comprising:

a second compensating means for detecting an opening/closing speed of said throttle valve, and compensating said PWM control signal in response to said opening/closing speed of said throttle valve.

* * * * *